United States Patent [19]

Williams et al.

[11] Patent Number: 4,872,824
[45] Date of Patent: Oct. 10, 1989

[54] APPARATUS FOR PRODUCING GROOVED SUPPORT MEMBER FOR OPTIC FIBERS

[75] Inventors: Robert J. Williams; Randall J. Smith, both of Saskatoon, Canada

[73] Assignee: Northern Telecom Limited, Montreal, Canada

[21] Appl. No.: 167,227

[22] Filed: Mar. 11, 1988

Related U.S. Application Data

[62] Division of Ser. No. 26,230, Mar. 16, 1987, abandoned.

[51] Int. Cl.⁴ .................. B29C 47/02; G02B 6/44
[52] U.S. Cl. .................. 425/113; 226/177; 264/1.5; 425/321; 425/380; 425/391; 425/467
[58] Field of Search ........... 425/113, 376.1, 391, 425/321, 322, 467, 380; 264/1.5; 198/624; 226/177, 181, 189

[56] References Cited

U.S. PATENT DOCUMENTS

| 642,339 | 1/1900 | Krummel | 226/177 |
| 840,799 | 1/1907 | Paar | 226/177 |
| 2,032,260 | 2/1936 | Chapman | 226/177 |
| 3,118,635 | 1/1964 | Landsem | 226/177 |
| 3,596,819 | 8/1971 | Lambert | 226/177 |
| 3,620,432 | 11/1971 | Emery | 226/177 |
| 3,774,827 | 11/1973 | Graybeal | 226/177 |
| 4,205,899 | 6/1980 | King et al. | 350/96.23 |
| 4,528,148 | 7/1985 | Dotti | 264/1.5 |
| 4,673,540 | 6/1987 | Portinari | 264/1.5 |
| 4,744,935 | 5/1988 | Priaroggia et al. | 264/1.5 |

FOREIGN PATENT DOCUMENTS

| 1096566 | 3/1981 | Canada | 264/1.5 |
| 872812 | 6/1942 | France | 226/177 |

Primary Examiner—James C. Housel
Attorney, Agent, or Firm—R. J. Austin

[57] ABSTRACT

Apparatus for making a grooved support member for carrying optical fibers having an extrusion die for forming a plastics sheath upon a strength member so as to form the support member. The die aperture has projections extending into it so as to form the grooves in the support member. To form the grooves into sinuous configuration, a twisting device is located upstream from the die. The twisting device comprises a plurality of gripping wheels on each side of the passline of the strength member, the gripping wheels staggered along the passline. The gripping wheels are rotatable alternately in opposite directions around the passline.

5 Claims, 2 Drawing Sheets

APPARATUS FOR PRODUCING GROOVED SUPPORT MEMBER FOR OPTIC FIBERS

This invention relates to apparatus for providing a grooved support member for optical fibers and is a divisional of application Ser. No. 026,230 filed Mar. 16, 1987, in the name of Robert J. Williams, et al and entitled "Grooved Support Member For Optic Fibers" (now abandoned).

Optical cables comprise a plurality of optical fibers and some protective support for the fibers. To provide support, some cable structures have a central support member or core provided with a plurality of circumferentially spaced ribs which extend along the support member and project outwardly from it. Grooves defined between the ribs house one or more fibers. To enable the cable to be flexed during storage and installation and also in use while preventing tensions being applied to the fibers, it is common practice for the grooves to extend longitudinally of the cable while lying at an angle to the axis of the support member. In one accepted manner of doing this, the grooves extend in true helical fashion along the support member. In another accepted manner of causing the grooves to lie at an angle to the core axis, the grooves extend along the core in sinusoidal manner, i.e. in which the grooves lie at angles to the axis, alternately, in one direction around the support member and then in the other. With the sinusoidal arrangement, the grooves normally do not complete a revolution around the support member in either direction. The sinusoidal arrangement for the lay of the optical fibers is one which has been found to be most desirable in that it is the most convenient path for the optical fibers to follow for field repair and branch splicing purposes performed upon the cable. An optical cable structure in which the grooves may extend either helically or sinusoidally along the support member is described in U.S. Pat. No. 4,361,381, granted Nov. 30, 1982 and entitled "Optical Cable" in the name of R. J. Williams.

In U.S. Pat. No. 4,205,899, entitled "Optical Cables" and granted June 3, 1980 to F. D. King and T. S. Swiecki, there is described a commercially used method for producing a grooved support member for supporting fibers in which the grooves extend in sinusoidal fashion. As described in U.S. Pat. No. 4,205,899, the support member comprises a central metal strength member and a surrounding plastics sheath or sleeve which is formed upon the strength member by extrusion. The extrusion die is formed with a plurality of inwardly extending fingers or projections which are in a fixed position and which produce the grooves in the sheath during the extrusion process. To cause the grooves to follow their sinuous paths in spite of the fact that the projections are stationary, a twist unit is provided downstream from the extruder and this twist unit operates by gripping upon the plastics material of the sheath in a position where the driven material is relatively rigid, and then the twist unit is reciprocally rotated about the axis of the support member. This motion of the twist unit is imparted to the support member and causes the member to twist reciprocally along its length immediately downstream from the position at which it leaves the extruder orifice so that the grooves are deformed to extend around the support member alternatively in one direction and then in the other dependent upon the direction of movement of the twist unit. A problem with the commercial method of forming the sinusoidal grooves is that to achieve a desired degree of movement of the grooves around the axis of the support member in each direction, then the twist unit needs to be rotated in each direction for a distance substantially in excess of the desired degree of movement. This is because of the lag in the twist between the position at which the twist is applied at the twisting unit and the die orifice at which the twist first becomes effective. For instance if, in the finished support member, each groove is desired to move angularly around the axis of the support member by approximately 320°, then the distance between the twist unit and the die orifice dictates that the twist unit must be rotated for many revolutions to produce this degree of angular movement. The number of revolutions required by the twist unit is proportional to the distance between twist unit and die orifice. However, in practice, there is a minimum distance between the twist unit and die orifice and this is governed by the location of a cooling unit for solidifying the plastics material for the sheath to be capable of being gripped by the twist unit without causing damage. Unfortunately, this minimum distance still requires a substantial number of revolutions of the twist means to achieve the angular movement of the grooves around the axis of the support member. In addition, some of the twist already applied to the plastics sheath between the die orifice and the twist unit in one direction is immediately cancelled by twisting movement of the sheath in the opposite direction. As can be seen therefore, there are many variables that make it extremely difficult to predict the number of rotations of the twist unit required for a desired angular movement of the grooves. These complications are aggravated by the fact that the amount of resultant twist also depends upon the plasticity of the particular plastics material and also upon the structure and strength of the particular strength member being used. For instance, it has been common practice to use a strength member which is a steel cable formed from steel filaments twisted together. With this structure, the resistance to torsional twisting is greater in one direction than in the other and although the twist unit may be rotated for an equal number of rotations in each direction, the strength member will tend to return to a position of stability after the twisting operation takes place thereby resulting in the groves being angularly displaced in one direction around the support member to a greater extent than in the other direction. Such a situation is not considered to be desirable in the final construction of cable.

The present invention seeks to provide apparatus for forming a grooved support filament in which the degree of angular movement of sinusoidal grooves around the axis of the support member may be more controlled.

According to the present invention is provided apparatus for making a grooved support member for carrying optical fibers comprising an extrusion die defining a die aperture having circumferentially spaced and fixed projections defining grooves in plastic material to be extruded therethrough the extrusion die disposed upon a passline for passage of a straight member for the filament through the extrusion die and die aperture to extrude a plastics sheath onto the straight member, a twisting means located upstream form the die along the passline for gripping the strength member as it is fed through the twisting means and along the passline and means for rotating the twisting means alternatively in one direction and then in the other around the passline.

With the apparatus according to the invention, a better degree of control is possible so that the applied twist upstream from the extrusion die orifice can be more accurately determined to produce a desirable angular movement of the sinuous grooves around the support member. With the apparatus of the invention, there is direct control of the twist movement of the strength member itself, because the strength member is twisted directly and twist is not imparted to it through the plastics sheath as in the prior method of operation. Due to this, because the rigidified plastics sheath is not being relied upon for the purpose of producing the twist in the grooves, then the position for application of the twist to the strength member may be relatively closer to the die orifice than has previously been possible. As a result, there may be little difference between the amount of rotational twist applied to the strength member and the desired angular movement of the grooves which are produced. For instance, with the strength member being twisted from a position close to and upstream of the extrusion die, then for a finished angular movement of the grooves of about 320° around the axis of the support member in each direction, any twist unit need only be rotated between 360° and 500°. around the axis of the strength member.

One embodiment of the invention will now be described, by way of example, with reference to the accompanying drawings, in which.

Figure 1:
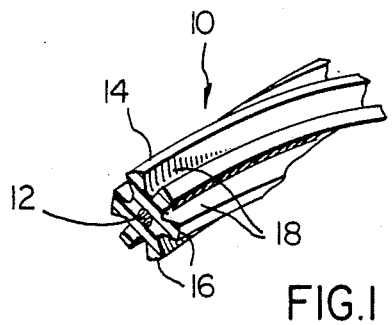
FIG. 1 is an isometric view of part of a grooved support member for optical fibers of a cable.

As shown in FIG. 1, a support member 10 for optical fibers comprises a central strength member 12 formed from fiberglass rod, or alternatively from cabled steel wires, and an extruded plastics sheath 14 surrounding the strength member 12. The plastic sheath 14 is formed with a plurality of circumferentially spaced ribs 16 which extend longitudinally of the support member and follow paths such that they define between them grooves 18 which follow sinusoidal paths along the core as shown by FIG. 1. Each groove extends along its path in each direction around the axis of the support member for a subtended angle of approximately 320° so that it does not form a complete revolution around the support member in either direction. The support member 10 may be used to form part of a cable structure as described in U.S. Pat. No. 4,361,381, entitled "Optical Cable" and granted on Nov. 30, 1982 to R. J. Williams. In that patent, the support member is referred to as a crush resistant core and a steel strength member which the core surrounds.

Figure 2:
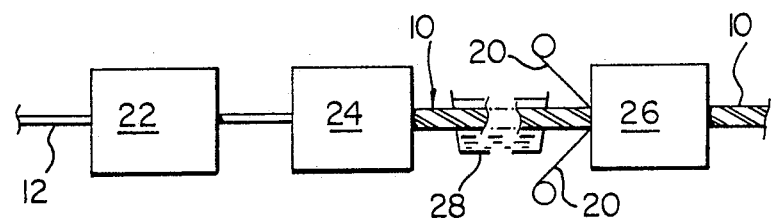
FIG. 2 is a schematic side elevational view of apparatus for making the support member shown in FIG. 1 and for laying optical fibers into grooves of the support member.

The support member 10 is made and optical fibers 20 (FIG. 2) are laid into the grooves 18 by the apparatus shown in FIG. 2. As shown generally by FIG. 2, the apparatus comprises, at an upstream end of the passline for the strength member 12, a twisting means 22 followed further downstream by an extruder 24 and laying device 26 for laying the optical fibers 20 into the grooves 18. The strength member 12 is fed through the twisting means 22 along its passline and through the extrusion die orifice (not shown) of extruder 24, the extruder operating to extrude the plastics sheath 16 onto the strength member and at the same time form the grooves 18 in the sheath. For the purpose of forming the grooves, the die is provided with a plurality of circumferentially spaced and fixed projections which assist in defining a die orifice of complementary shape to the grooved sheath. After the groove support filament has been cooled, for instance by passage through a water cooling trough 28, it then proceeds through the laying head 26. The optical fibers are provided from separate spools and proceed through the head 26 for laying into the grooves. The laying head may be of any suitable construction and may for instance be of the construction described in U.S. Pat. No. 4,483,134 entitled "Laying of Optical Waveguides onto a Support Filament", dated Nov. 20, 1984 and granted to G. McKay and R. J. Williams. To complete the cable (not shown), the support filament is then provided with a core wrap, metal shield and jacket in a conventional manner.

The strength member is rotationally twisted from a twisting position upstream from the die 24. The twisting means 22 is disposed closely adjacent to the die as no part of the apparatus is located between them. The distance between the twisting station ad the die orifice is exceedingly small thereby minimizing any unaccountable and unforeseen reasons for producing variation in path shape of the grooves for a predetermined degree of twist of the strength member. Thus, a greater degree of control of the path shape is producible for a predetermined degree of rotation of the twisting means. It has been found for instance that for a sinusoidal shape of the grooves in which each groove extends around the core for approximately 320°, then the twisting means is merely required to rotate around the passline for between 360° and 500°, dependent upon the strength and torsional characteristics of the strength member and the exact distance between the twisting station and the die orifice. Exact rotational movement of the twisting means may be easily set to achieve the desired sinusoidal path of the grooves. Further to this, because the rotation at the twisting head is minimized, then this effectively minimizes the work required from the twisting means itself and from any power unit involved so that energy used upon and wear on the apparatus are also reduced to a minimum. The twisting means 22 is illustrated in detail in FIGS. 3 and 4.

Figures 3, 4:
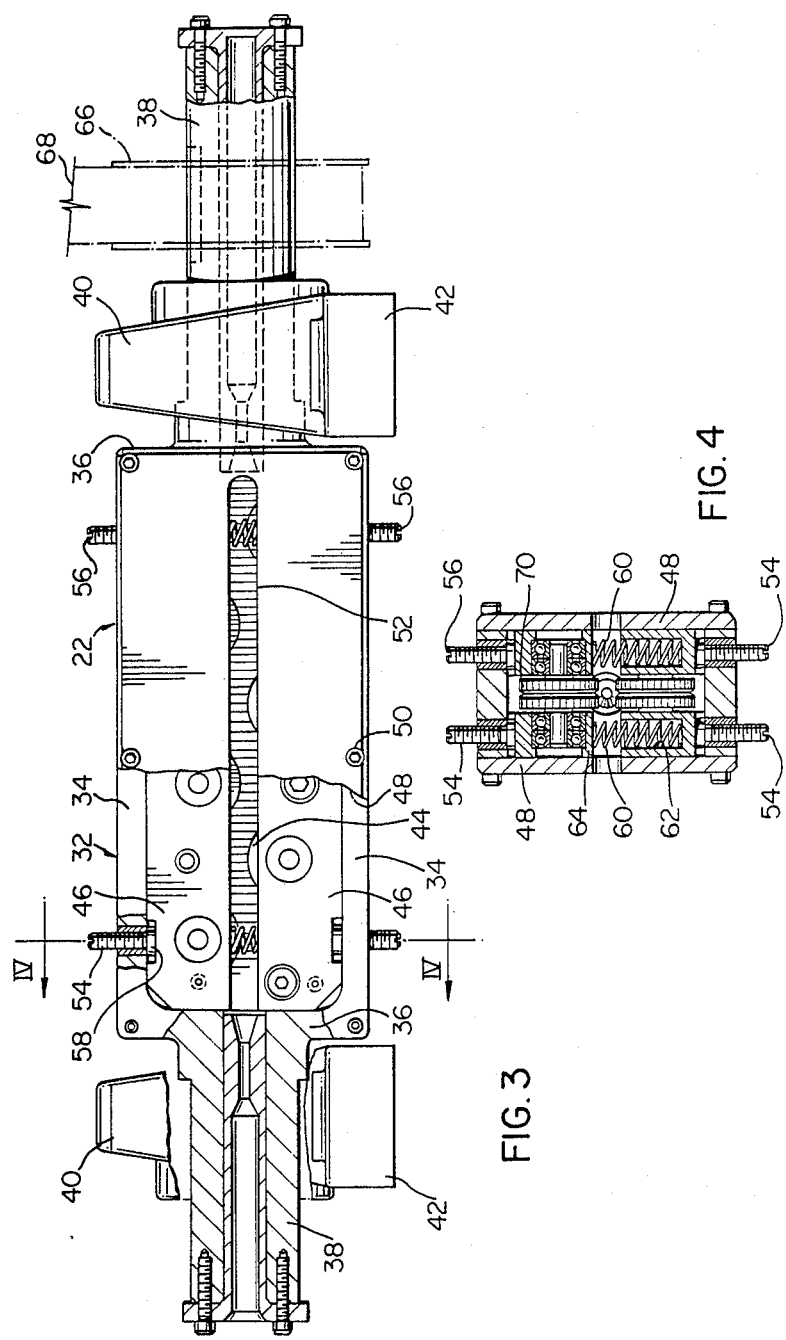
FIG. 3 is a side elevational view, partly in cross-section and on a larger scale than FIG. 2 of a twisting means incorporated in the apparatus.
FIG. 4 is a cross-sectional view of the twisting means taken along line IV—IV in FIG. 3.

As shown in FIG. 3, a housing 32 has two main and parallel walls 34, which lie on opposite sides of a chamber of the housing and short end walls 36 which extend inwardly towards the passline to connect the walls 34 to two bearing sleeves 38 coaxially aligned at opposite ends of the housing. The bearing sleeves 38 are rotatably mounted in bearings 40 carried by a machine frame 42 for rotatably mounting the housing around the passline which extends through the sleeves and through the housing.

The twisting means is provided with gripping means for gripping the strength member as it is fed along its passline. The gripping means comprises a plurality of gripping wheels 44 rotatably mounted on opposite sides of the passline with peripheral surfaces facing towards the passline. Wheels are spaced apart in series at each side of the passline in staggered positions from side-toside of the passline. The wheels are rotatably mounted upon mounting means in the form of blocks 46 which are slidable between two opposing chamber closing plates 48, secured by screws 50 to the walls 32 of the housing. The plates 48 effectively close the chamber except for a narrow slot 52 defined by each plate 48 in alignment with the passline. A wheel adjusting means is provided for adjustably positioning the blocks 46 and thus the wheels towards and away from the passline. The wheel adjusting means comprises adjustable screw threaded elements in the form of screws 54 disposed one at each end of the walls 34 of the housing and extending through these walls in screw threaded engagement therewith. Outer ends of the screws 54 are provided with screwdriver slots 56 and the inner ends have larger diameter pads 58 which have end surfaces lying in engagement with the blocks 46 to act as thrust surfaces for moving the blocks inwardly as the screws are moved into the walls 34. Thus, dependent upon screw position, the outer positional limits of the blocks are adjusted.

A resilient means is provided to urge each of the blocks away from the passline if the screws 54 are moved in an outward direction, the resilient means thus operating in the opposite direction from the thrust provided by the screws 54. The resilient means comprises compression springs 60 which, as shown in FIG. 4, are received within blind bores 62 of one of the mounting blocks 46 and lie in abutting engagement against an opposing surface 64 of the other block.

Figure 5:
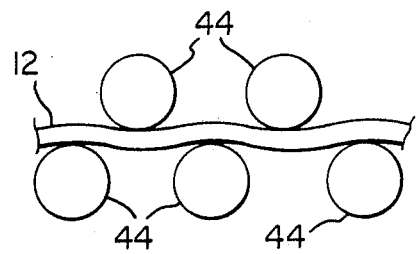
FIG. 5 is a side elevational view of parts of the twisting means showing them in use.
Figure 6:
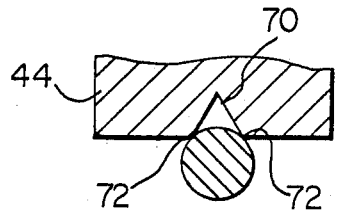
FIG. 6 is an enlarged cross-sectional view through part of the twisting means.

Means is also provided for rotating the twisting means and this comprises a driving pulley 66 secured to one of the sleeves 38, the driving pulley being drivable by a belt or chain means 68 from a prime mover which conveniently is a reversible electrical motor (not shown). In use of the apparatus, the strength member 12 is fed through the housing along the passline and lies with the wheels 44 in staggered relationship at each side of it. Wheels are positioned relative to the passline so that each wheel provides a sideways thrust upon the strength member to cause it to be slightly distorted from its true path as shown in FIG. 5 during its movement through the twisting means. The application of the force in this manner to the strength member is sufficient to impart a rotational twisting movement to the strength member from the twisting means as the twisting means is rotationally reciprocated around the passline. Application of a lateral load to the strength member is assisted by the structure of each of the wheels 44 which, as shown in FIG. 4, is provided with a peripheral V-shaped groove 70 which maintains the strength member on its path and at the junction 72 of the groove with the peripheral surface, the wheel makes a point contact with the strength member in the section shown in FIG. 6. Thus any lateral load applied by the wheels to the strength member is applied in each case along a short circumferential distance of each wheel which is merely a line contact thereby maximizing the pressure applied to the strength member.

With the above apparatus and with the twisting means described in the embodiment, a positive non-slipping rotational twisting action is applied from the twisting means to the strength member although the strength member is devoid of any surface feature which could be mechanically engaged and which could assist in the twisting operation.

As the strength member is moved along its path, the twisting means rotates to cause twisting rotation of the strength member alternately in one direction and then in the other. This twisting movement of the strength member extends through the die orifice and downstream from the die with the degree of twist diminishing progressively from the point of application. As the projections at the die orifice for forming the grooves are fixed, then the strength member twists relative to these projections and causes the unsolidified strength member immediately downstream from the die orifice to twist relative to the die projections. Thus, the grooves in the sheath are caused to extend around the axis of the support member after issuing from the die first in one direction and then in the other. The twisting influence upon the sheath is effective downstream from the die orifice to a position at which the sheath has cooled and solidified to become sufficiently rigid to resist twisting.

What is claimed is:

1. Apparatus for making a grooved support member for carrying optical fibers comprising an extrusion die defining a die aperture having circumferentially spaced and fixed projections defining grooves in plastics material to be extruded therethrough, the extrusion die disposed upon a passline for passage of a strength member for the grooved support member through the extrusion die and die aperture to extrude a plastic sheath onto the strength member, a twisting means located upstream from the die along the passline for gripping the strength member as said member is fed through the twisting means and along the passline, the twisting means comprising a plurality of gripping wheels rotatably mounted on opposite sides of the passline with their peripheral surfaces facing towards the passline, the wheels on each side of the passline spaced apart along the passline with the wheels staggered in position along the passline from one side of the passline to the other and a means for rotating the gripping wheels alternately in one direction and then in the other direction around the passline.

2. Apparatus according to claim 1 wherein the gripping wheels on each side of the passline are mounted upon a common mounting means and a wheel adjusting means is provided for adjusting the position of the wheels relative to the passline, the wheel adjusting means operative to adjust the position of each mounting means relative to the passline.

3. Apparatus according to claim 2 wherein the wheel adjusting means comprises adjustable screw threaded elements for controlling the positions of the mounting means relative to the passline.

4. Apparatus according to claim 2 provided with a housing surrounding and rotatable around the passline, the mounting means mounted and slidable within the housing for movement towards and away from the passline and the wheel adjusting means comprising screw threaded means extending through and in screw threaded engagement with the housing and having thrust surfaces in engagement with the mounting means for adjusting outer positional limits of the mounting means as set by positions of the screw threaded means.

5. Apparatus according to claim 4 comprising a resilient means disposed to urge each of the mounting means away from the passline and movement to the screw threaded means into the housing acts against the urgency of the resilient means.

* * * * *